US006257222B1

(12) United States Patent
Kaeser

(10) Patent No.: US 6,257,222 B1
(45) Date of Patent: Jul. 10, 2001

(54) CANOPY FOR A WET SAW

(76) Inventor: Michael Kaeser, 3050 S. Bristol #2-C, Santa Ana, CA (US) 92704

( * ) Notice: Subject to any disclaimer, the term of this patent is extended or adjusted under 35 U.S.C. 154(b) by 0 days.

(21) Appl. No.: 09/193,807

(22) Filed: Nov. 17, 1998

(51) Int. Cl.[7] .................................................. B24B 55/04
(52) U.S. Cl. ........................ 125/12; 125/13.01; 451/451; 451/452; 83/440.2
(58) Field of Search ............................... 83/440.2; 125/1, 125/12, 13.01; 451/451, 452, 457

(56) References Cited

U.S. PATENT DOCUMENTS

| 2,655,067 | * | 10/1953 | Bechler . | |
|---|---|---|---|---|
| 2,714,926 | * | 8/1955 | Nichta . | |
| 3,183,629 | | 5/1965 | Meulen . | |
| 3,653,164 | * | 4/1972 | Price et al. . | |
| 3,860,085 | * | 1/1975 | Gilbert et al. . | |
| 4,062,391 | * | 12/1977 | Piazzola . | |
| 4,578,907 | * | 4/1986 | Cayley et al. . | |
| 4,656,995 | * | 4/1987 | Merwin . | |
| 5,457,915 | | 10/1995 | Voege | 451/455 |
| 5,477,844 | | 12/1995 | Meister | 125/14 |

* cited by examiner

Primary Examiner—Timothy V. Eley
(74) Attorney, Agent, or Firm—Goldstein Law Offices P.C.

(57) ABSTRACT

A canopy for a wet saw including a cover member adapted for extending between the motor portion and the water pan of the wet saw. The cover member has a main panel and a pair of opposed side panel. An upper edge of the main panel has a pair of tabs extending upwardly therefrom. Upper fastening means are coupled with the tabs of the upper edge of the main panel of the cover member and with the motor portion of the wet saw to facilitate securement of the cover member to the wet saw. Lower fastening means are coupled with the main panel of the cover member upwardly of the lower edge thereof and with the water pan of the wet saw to facilitate securement of the cover member to the wet saw.

5 Claims, 2 Drawing Sheets

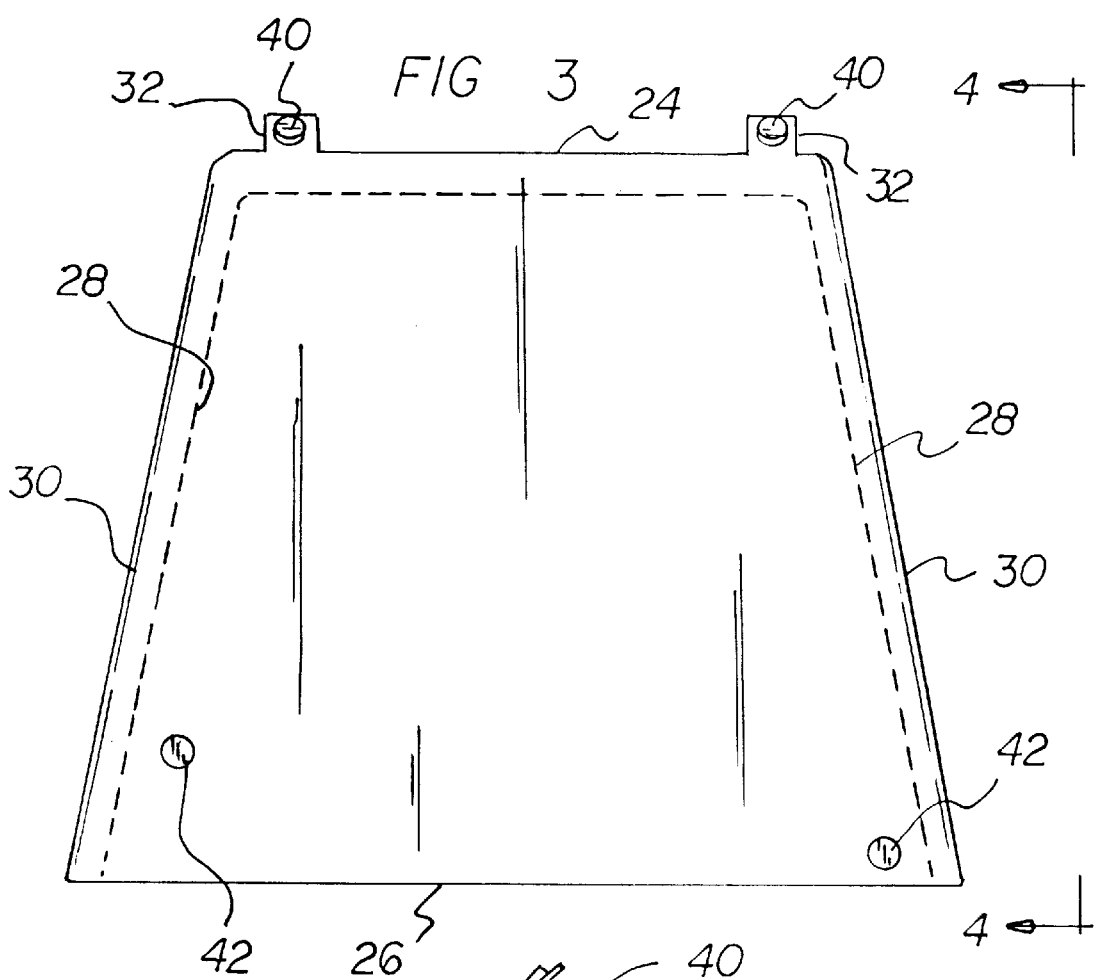
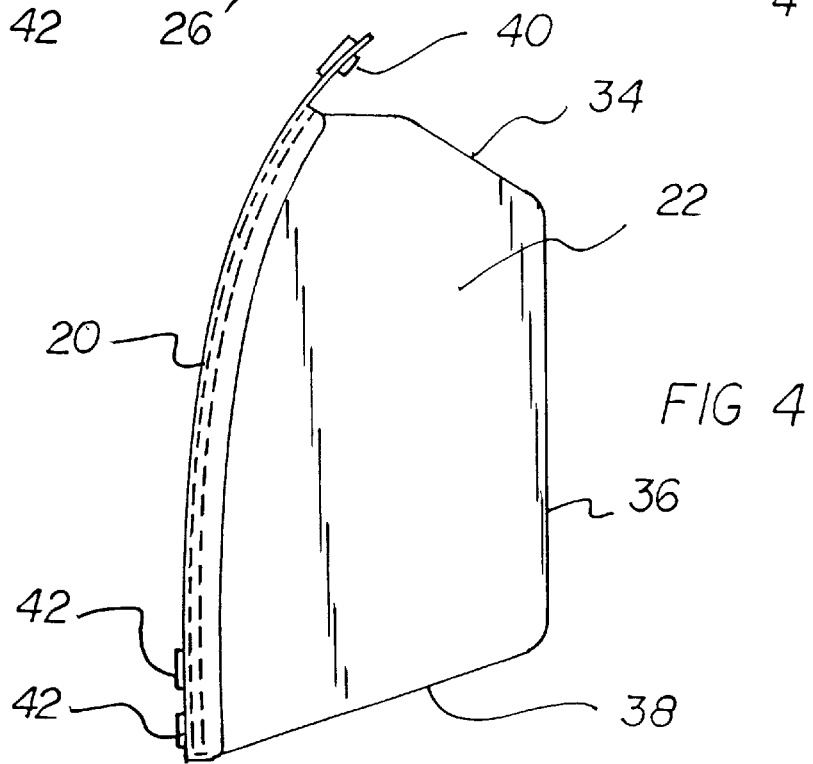

CANOPY FOR A WET SAW

BACKGROUND OF THE INVENTION

The present invention relates to a canopy for a wet saw and more particularly pertains to containing mist and residue that is sprayed on a saw blade.

When using a wet saw, the design of the saw itself has very little means for containment at the back of the saw. This generally allows for the mist and the residue that sprays onto the saw blade to be sprayed outwardly of the wet saw, often getting the user and the surrounding area wet and dirty. This also creates a need to keep adding water to the pan of the wet saw for its continued use.

There exists a need for a cover member or the like that can be clamped onto the top of the saw and can also be put over the back of the saw into the pan containing the water. This cover member will contain the water within the pan and allow for it to be reused.

The use of containment devices for tile saws is known in the prior art. More specifically, containment devices for tile saws heretofore devised and utilized for the purpose of minimizing spraying are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,457,915 to Voege discloses a tile saw with a transparent shield for preventing water from splattering in an interior setting. The Voege device is constructed of a transparent plastic. U.S. Pat. No. 3,183,629 to Meulen discloses a flexible splash curtain for a wet belt grinder with means to raise and lower the curtain. U.S. Pat. NO. 5,477,844 to Meister discloses a recovery system for a wet cutting saw.

While these devices fulfill their respective, particular objective and requirements, the aforementioned patents do not describe a canopy for a wet saw for containing mist and residue that is sprayed on a saw blade.

In this respect, the canopy for a wet saw according to the present invention substantially departs from the conventional concepts and designs of the prior art, and in doing so provides an apparatus primarily developed for the purpose of containing mist and residue that is sprayed on a saw blade.

Therefore, it can be appreciated that there exists a continuing need for new and improved canopy for a wet saw which can be used for containing mist and residue that is sprayed on a saw blade. In this regard, the present invention substantially fulfills this need.

SUMMARY OF THE INVENTION

In the view of the foregoing disadvantages inherent in the known types of containment devices for tile saws now present in the prior art, the present invention provides an improved canopy for a wet saw. As such, the general purpose of the present invention, which will be described subsequently in greater detail, is to provide a new and improved canopy for a wet saw and method which has all the advantages of the prior art and none of the disadvantages.

To attain this, the present invention essentially comprises a wet saw having a motor portion disposed on an upper plane and a water pan disposed on a lower plane. A cover member is adapted for extending between the motor portion and the water pan of the wet saw. The cover member is fabricated of a stretchable fabric material. The cover member has a main panel and a pair of opposed side panel. The main panel has an upper edge, a lower edge, and opposed side edges. The lower edge has a length greater than a length of the upper edge whereby the opposed side edges are angularly disposed between the upper edge and the lower edge. Each of the opposed side edges have a downwardly turned outer portion. The upper edge has a pair of tabs extending upwardly therefrom. The pair of opposed side panels each have an outer end secured to the downwardly turned outer portion of the opposed side edges of the main panel. Each of the opposed side panels have an angled upper end, a linear inner end, and an upwardly extending lower end. Upper fastening means are coupled with the tabs of the upper edge of the main panel of the cover member and with the motor portion of the wet saw to facilitate securement of the cover member to the wet saw. Lower fastening means are coupled with the main panel of the cover member upwardly of the lower edge thereof and with the water pan of the wet saw to facilitate securement of the cover member to the wet saw.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved canopy for a wet saw which has all the advantages of the prior art containment devices for tile saws and none of the disadvantages.

It is another object of the present invention to provide a new and improved canopy for a wet saw which may be easily and efficiently manufactured and marketed.

It is a further object of the present invention to provide a new and improved canopy for a wet saw which is of durable and reliable construction.

An even further object of the present invention is to provide a new and improved canopy for a wet saw which is susceptible of a low cost of manufacture with regard to both materials and labor, and which accordingly is then susceptible of low prices of sale to the consuming public, thereby making such a canopy for a wet saw economically available to the buying public.

Even still another object of the present invention is to provide a new and improved canopy for a wet saw for containing mist and residue that is sprayed on a saw blade.

Lastly, it is an object of the present invention to provide a new and improved canopy for a wet saw including a cover member adapted for extending between the motor portion and the water pan of the wet saw. The cover member has a main panel and a pair of opposed side panel. An upper edge of the main panel has a pair of tabs extending upwardly therefrom. Upper fastening means are coupled with the tabs of the upper edge of the main panel of the cover member and with the motor portion of the wet saw to facilitate securement of the cover member to the wet saw. Lower fastening means are coupled with the main panel of the cover member upwardly of the lower edge thereof and with the water pan of the wet saw to facilitate securement of the cover member to the wet saw.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view of the present invention.

FIG. 4 is a side elevation view of the present invention as taken along line 4—4 of FIG. 3.

The same reference numerals refer to the same parts through the various figures.

DESCRIPTION OF THE PREFERRED EMBODIMENT

Figure 1:
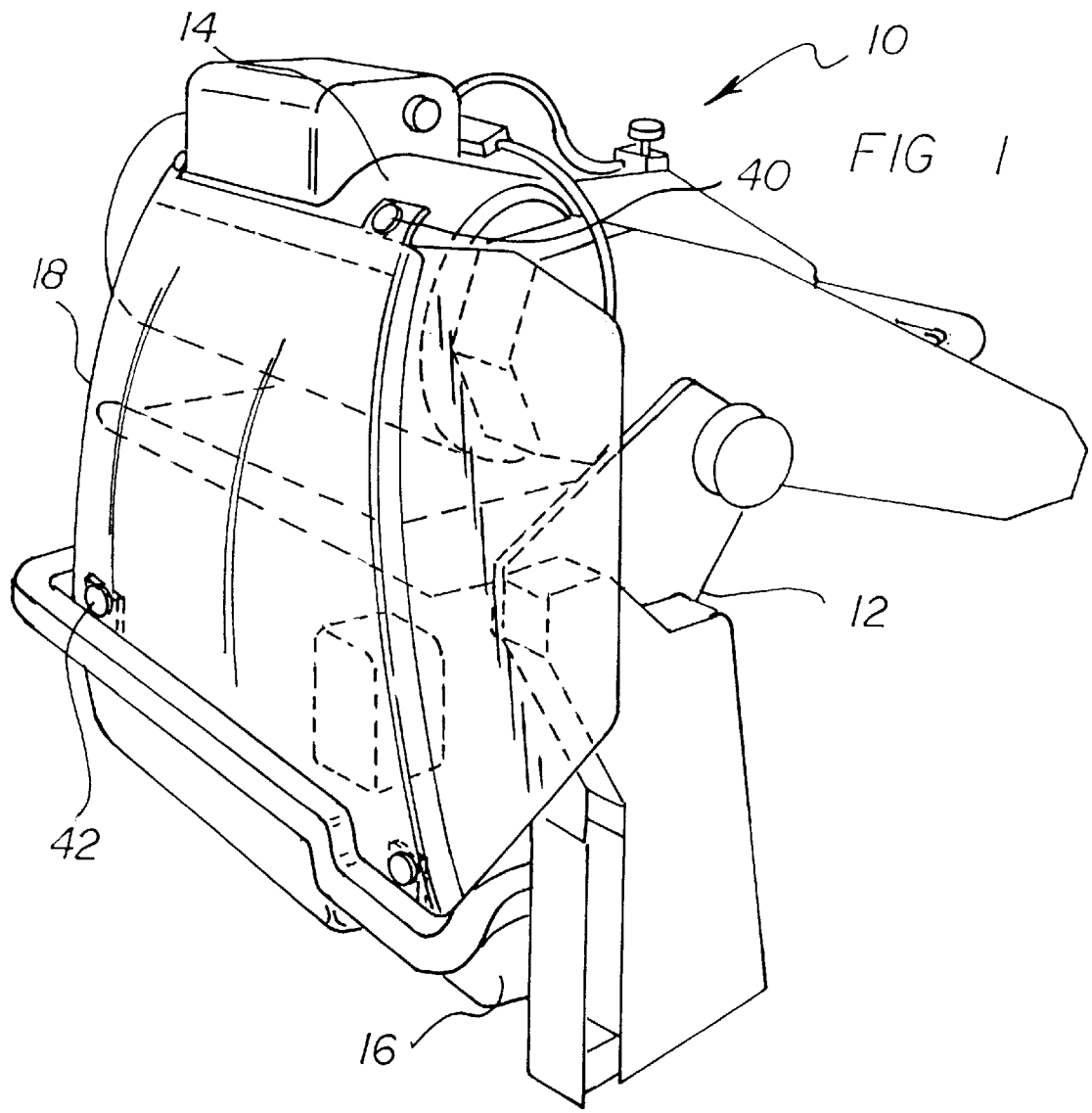
FIG. 1 is a perspective view of the preferred embodiment of the canopy for a wet saw constructed in accordance with the principles of the present invention.
Figure 2:
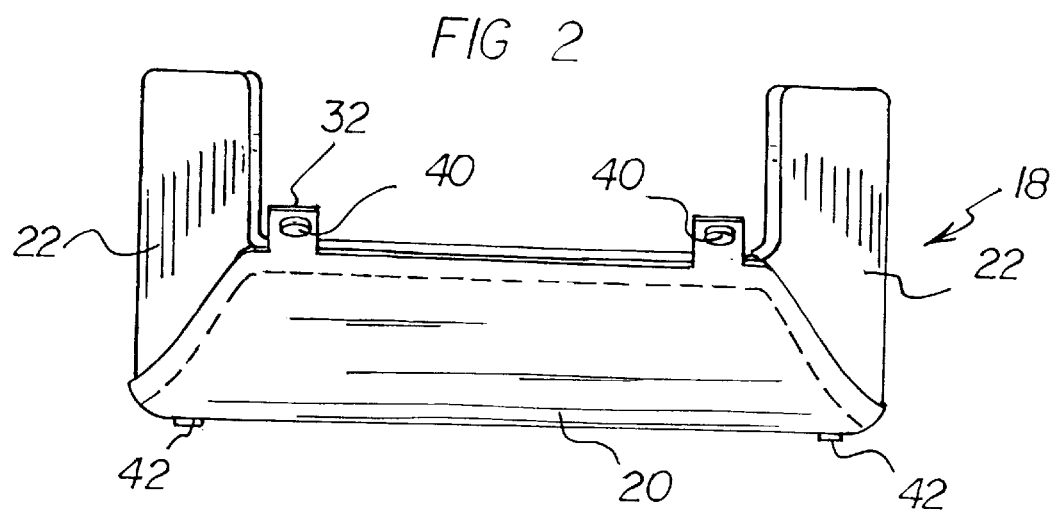
FIG. 2 is a top plan view of the present invention illustrated disengaged from the wet saw.

With reference now to the drawings, and in particular, to FIGS. 1 through 4 thereof, the preferred embodiment of the new and improved canopy for a wet saw embodying the principles and concepts of the present invention and generally designated by the reference number 10 will be described.

Specifically, it will be noted in the various Figures that the device relates to a canopy for a wet saw for containing mist and residue that is sprayed on a saw blade. In its broadest context, the device consists of a wet saw, a cover member, upper fastening means, and lower fastening means. Such components are individually configured and correlated with respect to each other so as to attain the desired objective.

The wet saw 12 has a motor portion 14 disposed on an upper plane and a water pan 16 disposed on a lower plane.

The cover member 18 is adapted for extending between the motor portion 14 and the water pan 16 of the wet saw 12. The cover member 18 is fabricated of a stretchable fabric material. This allows the cover member 18 to stretch in order to properly fit wet saws of varying sizes. The cover member 18 has a main panel 20 and a pair of opposed side panel 22. The main panel 20 has an upper edge 24, a lower edge 26, and opposed side edges 28. The lower edge 26 has a length greater than a length of the upper edge 24 whereby the opposed side edges 28 are angularly disposed between the upper edge 24 and the lower edge 26. Each of the opposed side edges 28 have a downwardly turned outer portion 30. The upper edge 24 has a pair of tabs 32 extending upwardly therefrom. The pair of opposed side panels 22 each have an outer end secured to the downwardly turned outer portion 30 of the opposed side edges 28 of the main panel 20. Each of the opposed side panels 22 have an angled upper end 34, a linear inner end 36, and an upwardly extending lower end 38.

Upper fastening means 40 are coupled with the tabs 32 of the upper edge 24 of the main panel 20 of the cover member 18 and with the motor portion 14 of the wet saw 12 to facilitate securement of the cover member 18 to the wet saw 12.

Lower fastening means 42 are coupled with the main panel 20 of the cover member 18 upwardly of the lower edge 26 thereof and with the water pan 16 of the wet saw 12 to facilitate securement of the cover member 18 to the wet saw 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed is:

1. A canopy for a wet saw, used in combination with a wet saw, for containing mist and residue that is sprayed on a saw blade comprising, in combination:

a wet saw having a motor portion disposed on an upper plane and a water pan disposed on a lower plane;

a cover member adapted for extending between the motor portion and the water pan of the wet saw, the cover member being fabricated of a stretchable fabric material, the cover member having a main panel and a pair of opposed side panel, the main panel having an upper edge, a lower edge, and opposed side edges, the lower edge having a length greater than a length of the upper edge whereby the opposed side edges are angularly disposed between the upper edge and the lower edge, each of the opposed side edges having a downwardly turned outer portion, the upper edge having a pair of tabs extending upwardly therefrom, the pair of opposed side panels each having an outer end secured to the downwardly turned outer portion of the opposed side edges of the main panel, each of the opposed side panels having an angled upper end, a linear inner end, and an upwardly extending lower end;

upper fastening means coupled with the tabs of the upper edge of the main panel of the cover member and with the motor portion of the wet saw to facilitate securement of the cover member to the wet saw;

lower fastening means coupled with the main panel of the cover member upwardly of the lower edge thereof and with the water pan of the wet saw to facilitate securement of the cover member to the wet saw.

2. A canopy for a wet saw, used in combination with a wet saw, for containing mist and residue that is sprayed on a saw blade comprising, in combination:

a cover member adapted for extending between a motor portion and a water pan of a wet saw, the cover member being fabricated of a stretchable fabric material, the cover member having a main panel and a pair of opposed side panel, an upper edge of the main panel having a pair of tabs extending upwardly therefrom;

upper fastening means coupled with the tabs of the upper edge of the main panel of the cover member and with the motor portion of the wet saw to facilitate securement of the cover member to the wet saw;

lower fastening means coupled with the main panel of the cover member upwardly of a lower edge thereof and with the water pan of the wet saw to facilitate securement of the cover member to the wet saw.

3. The canopy for a wet saw as set forth in claim 2 wherein the cover member is fabricated of a stretchable fabric material.

4. The canopy for a wet saw as set forth in claim 2 wherein the main panel has an upper edge, a lower edge, and opposed side edges, the lower edge having a length greater than a length of the upper edge whereby the opposed side edges are angularly disposed between the upper edge and the lower edge, each of the opposed side edges having a downwardly turned outer portion.

5. The canopy for a wet saw as set forth in claim 4 wherein the pair of opposed side panels each have an outer end secured to the downwardly turned outer portion of the opposed side edges of the main panel, each of the opposed side panels having an angled upper end, a linear inner end, and an upwardly extending lower end.

\* \* \* \* \*